Oct. 6, 1953 — A. P. KRUEGER — 2,654,598
TAPE-DISPENSING DEVICE
Filed July 12, 1946 — 3 Sheets-Sheet 2
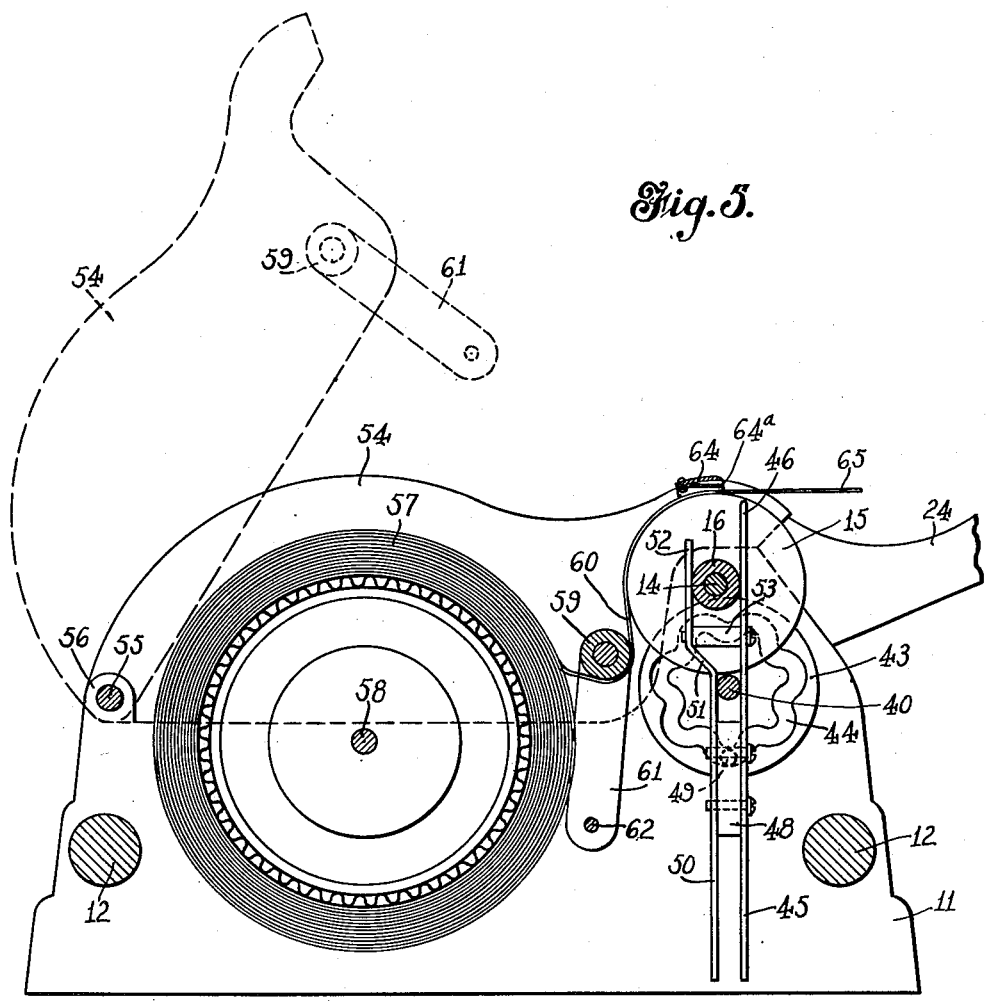
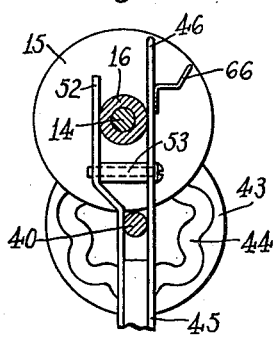
Inventor
Alfred P. Krueger
By Rockwell Bartholow
Attorneys Oct. 6, 1953
A. P. KRUEGER
2,654,598
TAPE-DISPENSING DEVICE
Filed July 12, 1946
3 Sheets—Sheet 3
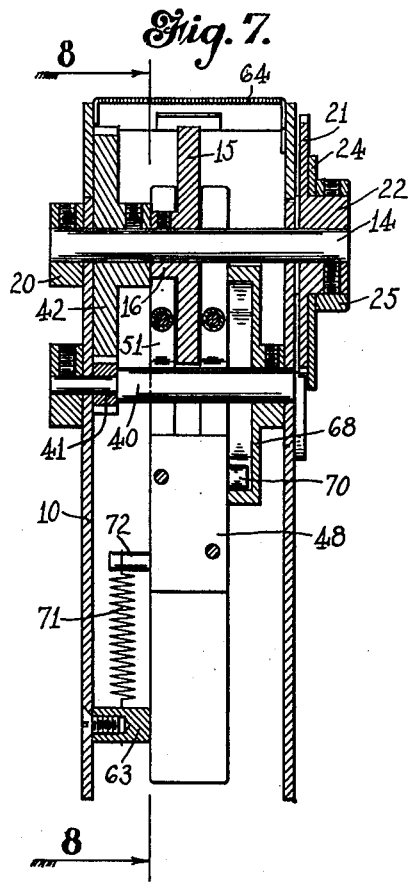
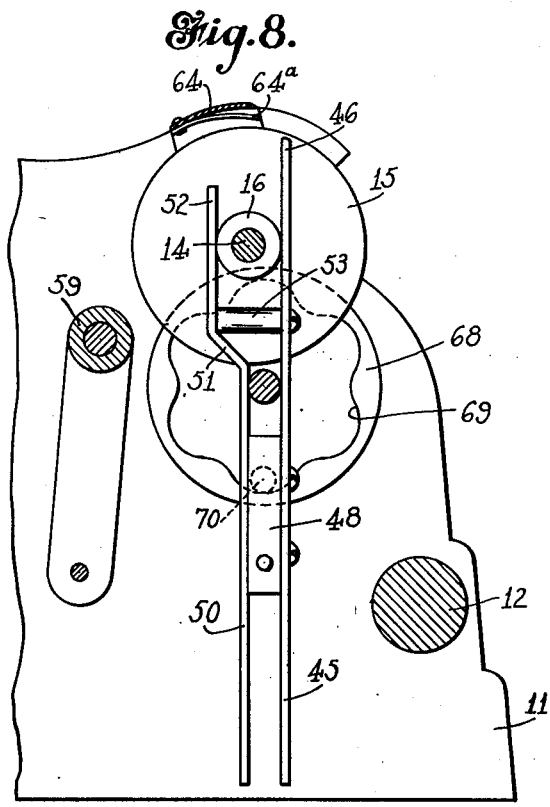
Inventor
Alfred P. Krueger
By Rockwell + Bartholow
Attorneys Patented Oct. 6, 1953

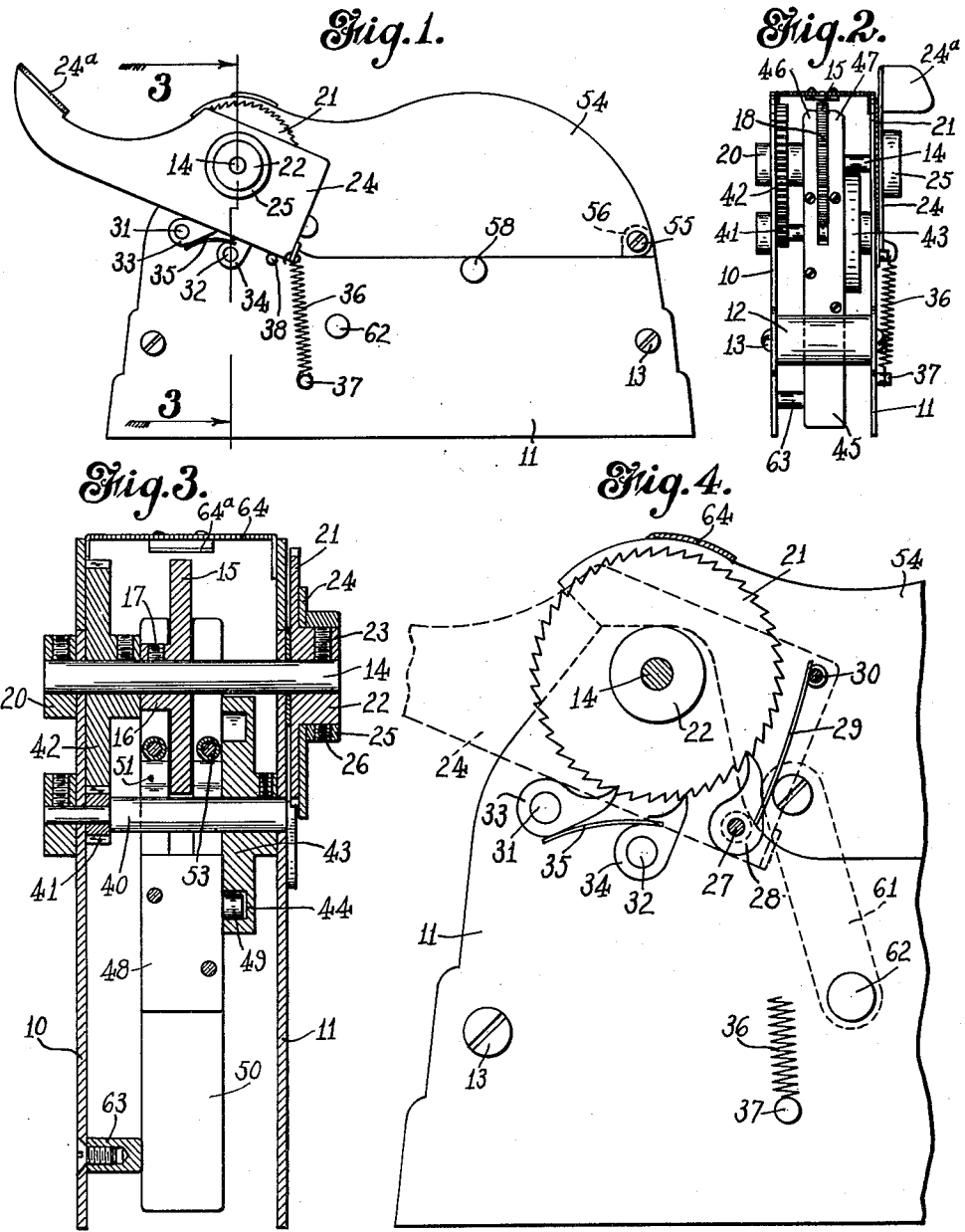

2,654,598

UNITED STATES PATENT OFFICE 2,654,598

TAPE-DISPENSING DEVICE

Alfred P. Krueger, Stratford, Conn., assignor to Derby Sealers, Incorporated, Derby, Conn., a corporation of Connecticut Application July 12, 1946, Serial No. 683,248

11 Claims. (Cl. 271—2.4)

This invention relates to machines for dispensing pressure-sensitive tape. A characteristic of this tape is that it is tacky upon one side, and will adhere to a surface to which it is applied by a given amount of pressure without being moistened, so that while the dispensing of such tape does not entail a moistening operation, it is rendered difficult due to the tacky nature of the material and its tendency to adhere to any surface with which it comes in contact.

It requires a considerable effort to draw the tape from the supply roll, and in the present instance this is attained by providing a rotatable feed roll to the surface of which the tacky side of the tape is adapted to contact and adhere. This feed roll is driven by a manually operated lever through a one-way connection, so that, as the lever is oscillated to and fro, the feed roll is intermittently rotated in a forward direction to feed the tape.

In order that the tape will not be continuously carried around by the feed roll, but will be caused to be delivered or to project from the machine so that it may be grasped by the operator, I provide a stripping device which is operated in a reciprocatory path against and from the tacky surface of the tape in order to detach it from the feed roll.

A severing device, herein shown as a tear-off blade, may be provided above the feed roll, so that when the operator grasps the stripped end of the tape he may bring it into contact with the blade and tear off the stripped portion for use, leaving a portion of the unsevered end in contact with the feed roll, so that, upon a subsequent operation of the latter, a further length may be drawn from the supply roll. In the present instance the reciprocating stripper members are operated by a very simple and economical mechanism, and, moreover, are guided in a straight-line movement so that they move to and from the surface of the tape in a truly reciprocating manner.

One object of the present invention is to provide a novel machine for dispensing pressure-sensitive tape.

Another object of the invention is to provide a machine for dispensing pressure-sensitive tape, having a feed roll to which the tape is adapted to adhere, and reciprocating stripping means for stripping the tape from this roll.

A still further object of the invention is to provide a device of the class described, having a feed roll and a novel stripping mechanism for detaching the tape from the feed roll.

Still another object of the invention is to provide a guide means for guiding the tape from the supply roll to the feed roll, the guiding means being so arranged that when a new supply roll is inserted the guide means may be moved to an out-of-the-way position to facilitate threading the tape through the machine.

To these and other ends the invention consists in the novel features and combinations of parts to be hereinafter described and claimed.

In the accompanying drawings:

Fig. 1 is a side elevational view of a tape-dispensing machine embodying my invention;

Fig. 2 is a front elevational view thereof;

Fig. 3 is a sectional view on line 3—3 of Fig. 1;

Fig. 4 is a side elevational view of the forward end of the machine, the operating lever being omitted to show certain of the parts;

Fig. 5 is a longitudinal sectional view through the machine;

Fig. 6 is a detail view showing a slightly modified form of stripper mechanism;

Fig. 7 is a sectional view similar to Fig. 3 but showing a modified form of my device; and Fig. 8 is a sectional view on line 8—8 of Fig. 7.

To illustrate a preferred embodiment of my invention, I have shown a tape-dispensing mechanism including a supporting frame comprising side members 10 and 11, which members may be held in spaced relation by any suitable means such as spacing collars 12 and screws 13. Rotatably mounted in the frame members 10 and 11 is a shaft 14, to which is secured a feed roll 15, the feed roll having a hub 16 which may be secured to the shaft by a set screw 17. The feed roll may be provided with a knurled or roughened surface 18, in order that the tape will properly adhere thereto and be more easily stripped therefrom.

As shown in Fig. 3, the shaft 14 extends beyond the frame members, and on one end carries a stop collar 20, while on the other end is secured a ratchet wheel 21, this wheel having a hub 22 secured to the shaft by a set screw 23. Rotatably mounted on the hub 22 of the ratchet wheel is the operating lever 24, this lever being held in place by a collar 25 secured to the hub 22 by the set screw 26.

Pivoted at 27 to the body of the lever 24, is a pawl 28 the tooth of which is engaged with the teeth of the ratchet wheel 21 in the usual manner, the pawl being urged into engagement with the wheel by a spring 29 acting against the pawl at one end and against a pin 30 on the lever 24 at the other end.

Pivoted to the frame member 11 at 31 and 32 are holding pawls 33 and 34, urged into contact with the teeth of the ratchet wheel by a spring 35, which pawls prevent reverse movement of the ratchet wheel upon reverse movement of the lever 24. Two of these holding pawls are provided in order that one may always engage the root of a tooth of the ratchet wheel 21, without any appreciable backlash.

A spring 36 is secured at one end to the lever 24 and at the other end to a pin 37 on the frame member 11, which spring normally urges the lever 24 in a clockwise direction, as shown in Fig. 1, so that the lever will normally engage a stop 38 upon the frame member 11. It will be apparent that with this construction, when the forward end 24ᵃ of the lever 24 is engaged by the operator and pulled downwardly to move this lever in a counterclockwise direction, the ratchet wheel 21 will be rotated, thus rotating the shaft 14 to which this member is secured, and likewise rotating the feed roll 15 to feed the tape forwardly from the machine. When the lever is released, the spring 36 will return it to a position against the stop 38, and during this return or reverse movement the pawl 28 will move idly over the teeth of the ratchet wheel 21, the latter being positively restrained from reverse rotation by means of the holding pawls 33 and 34.

Also rotatably mounted in the side frames 10 and 11 is a second shaft 40 disposed substantially parallel to the shaft 14, and upon this second shaft is secured a pinion 41 the teeth of which mesh with a gear 42 secured to the shaft 14, so that the shaft 40 will be rotated whenever rotation is imparted to the shaft 14. Secured to the shaft 40 is a cam wheel 43 having a cam track or groove 44 therein, this cam track having, as shown more especially in Fig. 5, an undulating surface or shape at both inner and outer sides.

In order to strip the tape from the feed roll 15, I have provided a stripper member 45 (Figs. 2 and 5), which member is bifurcated at its upper end to span the feed roll 15 and provide stripper elements 46 and 47 on each side thereof and relatively close to the lateral surface of the roll. Secured to the stripper member 45 is a spacing block 48 from which projects a pin or follower 49 disposed in the undulating cam groove 44. Also secured to the block 48 in spaced relation to the member 45 is a guide plate or guide element 50 projecting upwardly in substantially parallel relation to the stripper member 45, but provided adjacent its upper end with an offset 51 so that the upper portion 52 of this member will be spaced a sufficient distance from the stripper members 46 and 47 to accommodate in a fairly snug fashion therebetween the hub 16 of the feed roll 15. The lower parallel portions of the members 45 and 50 also snugly receive between them the shaft 40, so that the stripper 45 is guided by the shaft 40 and the hub 16 in a straight-line reciprocatory movement when the cam wheel 43 is rotated. Spacing blocks 53 may be secured between the upper ends of these members to hold them in properly spaced relation.

A cover member 54 is hinged or pivoted at 55 upon ears 56 provided upon the frame members 10 and 11, so that this cover may be swung upwardly, as shown in dotted lines in Fig. 5, to permit the insertion of a supply roll of tape 57, this roll being carried upon a shaft 58 rotatably mounted in the frame members. A guide roll 59 is rotatably carried by the cover and when the latter is in closed position this roll is adapted to stand in the position shown in Fig. 5, so that the tape 60 issuing from the supply roll 57 will pass beneath this guide roll, with its nontacky side in contact therewith, and then pass upwardly around the feed roll 15. This arrangement provides a sufficient length of contact between the tacky side of the tape and the feed roll rearwardly of the strippers 46 and 47, so that the adhesive force of the tape to the feed roll will be sufficient to draw it from the supply roll. It is obvious that, if desired, a rearrangement of the relative positions of the supply roll and feed roll would bring about sufficient feeding contact between the tape and feed roll and render the use of a guide roller unnecessary.

Also secured to the cover 54 are one or more arms 61 which project downwardly from the cover and are provided with openings through which a pin 62 may be inserted, which pin is also inserted through registering openings in the frame members 10 and 11, in order to positively hold the cover in closed position. It will be apparent that this is desirable, as there is a considerable upward pull on the guide roller 59 during the operation of the machine, owing to the considerable amount of effort necessary to draw the tape from the supply roll, and this would tend to lift the cover about its hinge 55 if it were not secured.

In order to maintain the stripper member 45 against the cam member 43, so that the pin 49 will always be in engagement with the groove 44, a post 63 is mounted upon the frame member 10, and projects inwardly against the side edge of the member 45. A severing member 64 in the form of a tear-off blade is disposed above the feed roll 15 and supported by the cover. Thus the operator may, by grasping the free end 65 of the tape which has been stripped from the feed roll, move the stripped portion of the tape upwardly against the edge of the blade 64 and sever the tape for use.

It sometimes occurs that, upon continued use of the device, the tape will be found to adhere to the severing member 64. In order to prevent such an occurrence, I have shown a resilient stripping member 64ᵃ associated with the blade by being riveted thereto adjacent its rear end. This stripping member is resilient and tends to stand in spaced relation with the severing blade. It will offer only light resistance to the raising of the tape into contact with the severing blade for the severing operation, and after the latter has occurred will by its inherent resiliency return to its normal position, shown in Fig. 5, and cause the unsevered end of the tape to be stripped from the severing blade if it should tend to adhere thereto.

It is believed that the operation of the machine will be apparent from the foregoing description. It may be noted that, in placing a supply roll of tape in the machine, the cover 54 will be lifted and carry with it the guide roller and knife, thus leaving a free path for the free end 60 of the tape to be applied to the periphery of the feed roll 15 so that it will adhere thereto. Thereafter, the lowering of the cover 54 moves the knife into position and causes the roller 59 to engage the upper surface of the tape and move it downwardly into place, this roller in its final position, shown in Fig. 5, being disposed below the feed roll, so that a considerable portion of the tape will be in contact with the surface of the feed roll.

In Fig. 6 of the drawings I have shown a modified form of stripper device, wherein secured to the upper stripper elements 46 and 47 are auxiliary stripper arms 66, only one of which is shown. It will be understood, however, that there is a similar auxiliary arm upon the other side of the feed roll 15. This arm 66 is, of course, reciprocated with the stripper member 45, and serves to contact the tape forwardly of the member 46 so as to prevent any tendency of the tape to drop upon the surface of the feed roll after being stripped therefrom by the element 46 and readhere to this surface. In other words, the elements 46 and 66 contact the tape at two spaced points along its length, and as these elements are provided on each side of the feed roll 15, they will effectually strip the tape from this roll.

In Figs. 7 and 8 of the drawings I have shown a modification in which a different form of cam is employed for reciprocating the stripper elements. It will be recalled that the cam track 44, shown in connection with Figs. 1 to 5 of the drawings, is provided with an undulating surface or shape at both inner and outer sides, and therefore this serves to effect both to and fro movements of the stripper. The construction shown in Figs. 7 and 8 is similar to that shown in Figs. 1 to 5, except that the cam member 68 is provided with an internal cam track 69 having a wavy or undulating surface at one side only thereof. Co-operating with this cam surface is a follower pin 70 secured on the block 48 of the stripper mechanism, as before. A spring 71 is secured at its upper end to a pin 72 extending laterally from the block 48, and is secured at its lower end to the post 63 so as to normally urge the stripper elements downwardly, as shown in Fig. 7, and maintain the pin 70 in engagement with the cam track 69.

Thus, as will be obvious, the cam 69 effects upward movement of the stripper mechanism, and the downward movement of this mechanism is effected by the spring 71. Otherwise the construction is the same as in the form of my invention shown in Figs. 1 to 5.

While I have shown and described some preferred embodiments of my invention, it will be understood that it is not to be limited to all of the details shown, but is capable of modification and variation within the spirit of the invention and within the scope of the claims.

What I claim is:

1. In a machine for feeding pressure-sensitive tape, feeding means including a tape-advancing member to which the tape adheres, means to actuate said member to effect feeding of the tape, a vibratory stripping member to intermittently engage the tacky side of the tape and strip it from said feeding means, cooperating means on said stripping member and frame for slidably mounting the member on the frame and guiding it in a substantially straight-line path, and means for actuating said stripping member.

2. In a machine for feeding pressure-sensitive tape, feeding means including a rotating member to which the tape adheres, means to actuate said member to effect feeding of the tape, a reciprocatory stripping element slidably carried by the frame and disposed laterally of said member to strip the face end of the tape therefrom, and means actuating said element in a straight-line path against and from the tacky side of the tape.

3. In a machine for feeding pressure-sensitive tape, feeding means including a tape-advancing member having a traveling surface to which the tape adheres, means for actuating said member, a vibratory stripping member slidably carried by the frame, and means for moving said stripping member to and fro in a straight-line movement across the path of the tape on said surface and against the tacky side of the tape.

4. A machine as in claim 2, wherein the periphery of said rotating member is narrower than the width of the tape and a stripping element is disposed on each side of said rotating member in close proximity thereto.

5. In a machine for feeding pressure-sensitive tape, feeding means including a rotatable member to which the tape adheres, a shaft on which said member is mounted, a stripping element slidably carried by the frame and mounted adjacent said shaft to strip the tape from said member, means to rotate said shaft and reciprocate said stripping element against the tacky side of the tape, and means to guide said element in a straight-line movement.

6. In a machine for feeding pressure-sensitive tape, feeding means including a rotatable member to which the tape adheres, a shaft on which said member is mounted, a stripping element slidably carried by the frame and mounted adjacent said shaft to strip the tape from said member, means to rotate said shaft and reciprocate said stripping element against the tacky side of the tape, and means including said shaft to guide said element in a straight-line movement.

7. In a machine for feeding pressure-sensitive tape, feeding means including a rotatable member to which the tape adheres, a shaft on which said member is mounted, a stripping element slidably carried by the frame and mounted adjacent said shaft, means to rotate said shaft and reciprocate said stripping element including a member having a continuous cam surface, and a follower on said element in constant engagement with said surface.

8. In a machine for feeding pressure-sensitive tape, feeding means including a rotatable member to which the tape adheres, a shaft on which said member is mounted, a stripping element mounted adjacent said shaft, means to rotate said shaft and reciprocate said stripping element including a member having an undulatory cam track therein, and a follower on said element disposed in said track.

9. In a machine for feeding pressure-sensitive tape, feeding means including a rotatable member to which the tape adheres, a shaft on which said member is mounted, a stripping element mounted adjacent said shaft, means to rotate said shaft and reciprocate said stripping element including a member having a cam surface, and a follower on said element in engagement with said surface, means for rotating said last-named member including a second shaft, a guide element secured in spaced relation to said stripper element, and said shafts being disposed between said guide element and the stripper element to restrict the latter to a straight-line movement.

10. In a machine for feeding pressure-sensitive tape, feeding means including a rotatable member to which the tape adheres, a shaft on which said member is mounted, a stripping element mounted adjacent said shaft, means to rotate said shaft and reciprocate said stripping element including a member having a cam surface, and a follower on said element in engagement with said surface, means for rotating said last-named member including a second shaft, a guide element secured in spaced relation to said stripper element, and said shafts being disposed between said guide element and the stripper element to restrict the latter to a straight-line movement, said stripper element being bifurcated at its upper end to straddle said feeding member and contact the tape on both sides thereof.

11. In a machine for feeding pressure-sensitive tape, feeding means including a rotatable member to which the tape adheres, a shaft on which said member is mounted, a stripping element adjacent said shaft, means to rotate said shaft and reciprocate said stripping element including a member having a cam surface, a follower on said stripping element cooperating with said cam surface, and spring means for maintaining the follower in constant engagement with the cam surface.

ALFRED P. KRUEGER.

References Cited in the file of this patent

UNITED STATES PATENTS

| Number | Name | Date |
|---|---|---|
| 439,380 | Briggs | Oct. 28, 1890 |
| 977,418 | McEachron et al. | Nov. 29, 1910 |
| 1,016,270 | Johnson | Feb. 6, 1912 |
| 1,972,850 | McCarthy | Sept. 4, 1934 |
| 1,972,851 | McCarthy | Sept. 4, 1934 |
| 2,119,232 | Johnston | May 31, 1938 |
| 2,144,757 | Gilling | Jan. 24, 1939 |
| 2,243,686 | Steiner et al. | May 27, 1941 |
| 2,272,628 | Anderson | Feb. 10, 1942 |
| 2,434,776 | Van Cleef et al. | Jan. 20, 1948 |

FOREIGN PATENTS

| Number | Country | Date |
|---|---|---|
| 319,789 | Great Britain | Dec. 29, 1930 |